(12) United States Patent
Yang et al.

(10) Patent No.: US 9,294,927 B2
(45) Date of Patent: Mar. 22, 2016

(54) DATA FLOW TRANSMISSION VIA AGGREGATED BANDS

(71) Applicant: Verizon Patent and Licensing Inc., Arlington, VA (US)

(72) Inventors: Jin Yang, Orinda, CA (US); Thomas H. Tan, San Jose, CA (US); Kent W Hughes, Oakland, CA (US); Deepak Kakadia, Antioch, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 107 days.

(21) Appl. No.: 14/207,040

(22) Filed: Mar. 12, 2014

(65) Prior Publication Data

US 2015/0264577 A1 Sep. 17, 2015

(51) Int. Cl.
*H04W 16/14* (2009.01)
*H04W 24/08* (2009.01)
*H04W 84/04* (2009.01)

(52) U.S. Cl.
CPC .............. *H04W 16/14* (2013.01); *H04W 24/08* (2013.01); *H04W 84/045* (2013.01)

(58) Field of Classification Search
CPC ...................................................... H04W 16/14
USPC .................................. 370/252, 329, 208, 230
See application file for complete search history.

(56) References Cited

U.S. PATENT DOCUMENTS

| | | | | |
|---|---|---|---|---|
| 5,890,055 A * | 3/1999 | Chu et al. | ......................... | 455/16 |
| 5,940,373 A * | 8/1999 | Chiu et al. | ..................... | 370/238 |
| 7,630,332 B1 * | 12/2009 | Elliott | ............................. | 370/321 |
| 8,363,744 B2 * | 1/2013 | Agee et al. | ..................... | 375/267 |
| 8,442,069 B2 * | 5/2013 | Ji et al. | .......................... | 370/468 |
| 8,547,884 B2 * | 10/2013 | Lo et al. | .......................... | 370/295 |
| 8,989,762 B1 * | 3/2015 | Negus et al. | .................. | 455/454 |
| 2004/0053620 A1 * | 3/2004 | Garrison et al. | ............. | 455/448 |
| 2005/0003827 A1 * | 1/2005 | Whelan | ......................... | 455/454 |
| 2008/0170603 A1 * | 7/2008 | Hyon et al. | .................... | 375/214 |
| 2008/0317150 A1 * | 12/2008 | Alexander et al. | ............ | 375/260 |
| 2009/0029645 A1 * | 1/2009 | Leroudier | .......................... | 455/7 |
| 2009/0116430 A1 * | 5/2009 | Bonta et al. | ................... | 370/329 |
| 2009/0310501 A1 * | 12/2009 | Catovic et al. | ................ | 370/252 |
| 2011/0019715 A1 * | 1/2011 | Brisebois | ....................... | 375/130 |
| 2011/0149757 A1 * | 6/2011 | Hu et al. | ........................ | 370/252 |
| 2011/0158156 A1 * | 6/2011 | Ma et al. | ....................... | 370/315 |
| 2012/0129522 A1 * | 5/2012 | Kim et al. | ..................... | 455/434 |
| 2013/0077514 A1 * | 3/2013 | Dinan | ........................... | 370/252 |
| 2013/0165134 A1 * | 6/2013 | Touag et al. | ................ | 455/452.1 |
| 2013/0208587 A1 * | 8/2013 | Bala et al. | ..................... | 370/230 |
| 2013/0235746 A1 * | 9/2013 | Patel et al. | ..................... | 370/252 |
| 2013/0242932 A1 * | 9/2013 | Tiirola et al. | ................. | 370/329 |
| 2014/0031031 A1 * | 1/2014 | Gauvreau et al. | .......... | 455/426.1 |
| 2014/0045505 A1 * | 2/2014 | Henry et al. | .................. | 455/444 |
| 2014/0105046 A1 * | 4/2014 | Tellado et al. | ................ | 370/252 |
| 2014/0161002 A1 * | 6/2014 | Gauvreau et al. | ............ | 370/280 |
| 2015/0003414 A1 * | 1/2015 | Campos et al. | ............... | 370/331 |
| 2015/0043372 A1 * | 2/2015 | Nagata et al. | ................. | 370/252 |
| 2015/0043491 A1 * | 2/2015 | Eng et al. | ....................... | 370/329 |
| 2015/0117193 A1 * | 4/2015 | Marupaduga et al. | ..... | 370/230.1 |

* cited by examiner

Primary Examiner — Parth Patel (57) ABSTRACT

A network device may select one or more secondary bands in a spectrum based on a measure of quality of the one or more secondary bands; transmit information identifying the one or more secondary bands to an end unit; code, based on a coding scheme, a data flow to obtain multiple data signals that represent the data flow; and transmit, towards the end unit, the multiple data signals via the one or more secondary bands and a primary band.

20 Claims, 8 Drawing Sheets

DATA FLOW TRANSMISSION VIA AGGREGATED BANDS

BACKGROUND

A back-end network may include back-end network devices (e.g., small cells, femto cells, etc.) that communicate to provide connectivity to an external network. A back-end network may correspond to a non-line-of-sight (NLOS) network in which traffic may be transmitted via the back-end network devices when connectivity to an external network (e.g., a cellular network) is not available. For example, back-end network devices are sometimes deployed under rooftops, in dense building clutters, etc. where connectivity to the external network may not be available. The transmission of traffic may be assigned to particular bands (e.g., frequency ranges) in a spectrum. As network bandwidth demands increase, the amount of bandwidth provided over the particular bands may be insufficient to support the transmission of traffic.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may utilize multiple bands in a spectrum to transmit traffic via the multiple aggregated bands between back-end network devices, in a back-end network, in order to increase data rates, reliability, and/or otherwise increase the performance of data transmissions. For example, a single data flow (e.g., data sequence) may be orthogonally coded to obtain multiple data streams, which may each be transmitted over a different band.

Figure 1:
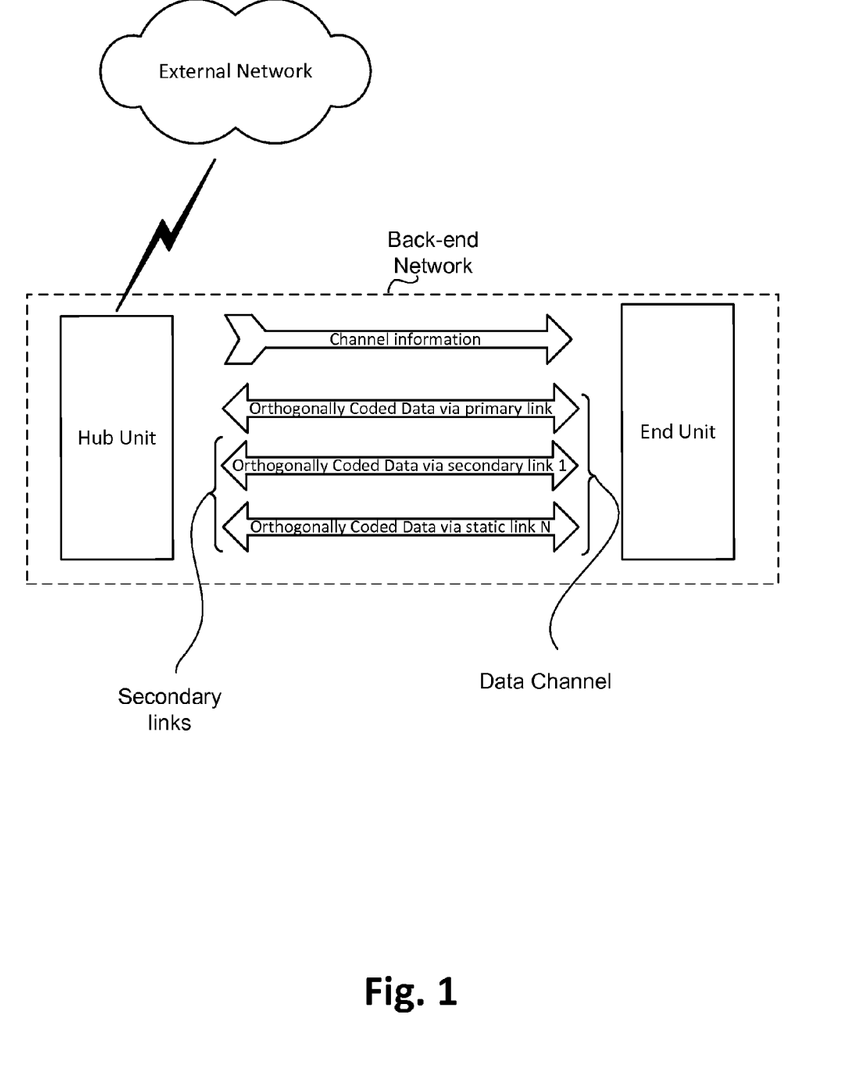
FIG. 1 illustrates an example overview of an implementation described herein.

FIG. 1 illustrates an example overview of an implementation described herein. In FIG. 1, back-end devices (e.g., an end unit and a hub unit) may communicate via a back-end network. In some implementations, the hub unit may be part of a macro cell that communicates with one or more end units. The hub unit may provide connectivity to an external network, such as a cellular network. For example, the hub unit may connect with an eNodeB (eNB) or some other type of network device to provide connectivity to the external network. The end unit may include a small cell, femto cell, or the like.

As shown in FIG. 1, the hub unit may provide channel information to the end unit (e.g., via a primary link). The primary link may correspond to a communications link already established between the hub unit and the end unit. As an example, the primary link may correspond to a link that utilizes an unlicensed band via which the hub unit and end unit communicate.

As used herein, the term "licensed band" may refer to a predetermined frequency range that is reserved and/or owned by a service provider for data flow transmission. Examples of licensed bands may include, for example, frequency bands commonly used pursuant to wireless networking using cellular networks (e.g., long-term evolution (LTE) network, etc.). As used herein, the term "unlicensed band" may refer to a frequency range that may be utilized for data flow transmission, but may not be predetermined or may not be owned (or leased) by the service provider. Examples of unlicensed bands may include, for example, frequency bands commonly used pursuant to wireless networking using Institute of Electrical and Electronics Engineers (IEEE) 802.11-based networking (e.g., WiFi). Also, unlicensed bands may refer to partially licensed bands and/or mmWave bands.

In some implementations, the channel information may identify one or more secondary links via which the hub unit and end unit may communicate (e.g., in addition to communicating over the primary link). Each secondary link may be a static link in which the hub unit and end unit may communicate via an unlicensed band. Also, the channel information may identify a coding sequence that may be used to encode a data flow for transmission via multiple bands. As shown in FIG. 1, the hub unit and end unit may communicate via an aggregation of a primary link and one or more secondary links. For example, a single data flow may be orthogonally coded to obtain multiple data streams, which may be transmitted over multiple different bands. As a result, bandwidth of the communication between the end unit and the hub unit may be supplemented by the secondary links thereby increasing transmission performance (e.g., as measured by reliability, data rates, latency, jitter, etc.). The encoding of the data flow may be performed at the physical layer (symbol level) in the Open Systems Interconnection (OSI) model.

Figure 2:
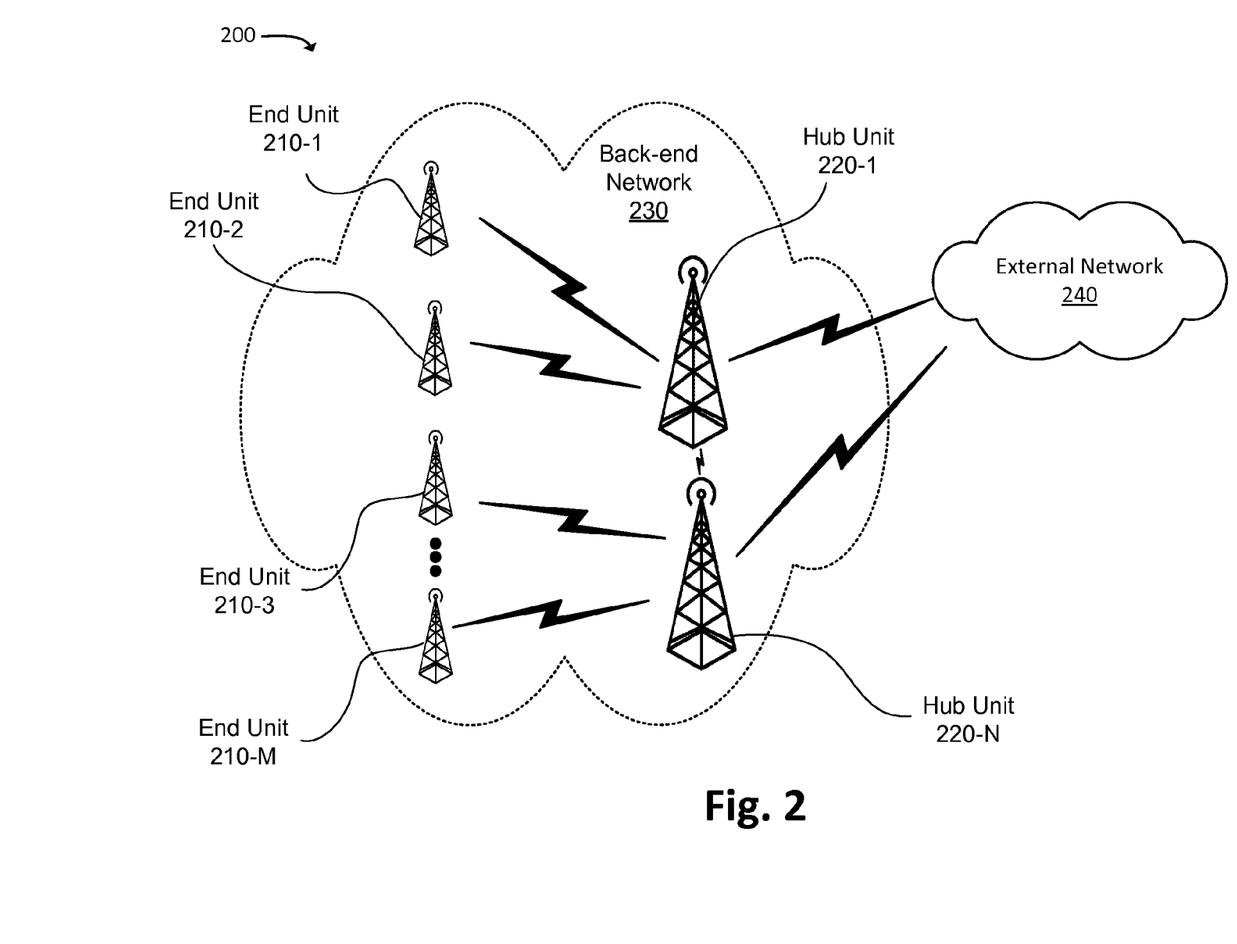
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include end units 210-1 through 210-M (where M is greater than or equal to 1), hub units 220-1 through 220-N, (where N is greater than or equal to 1), and back-end network 230.

End unit 210 may include one or more network devices that receive, process, and/or transmit traffic, such as audio, video, text, and/or other data, destined for and/or received from hub unit 220. In an example implementation, end unit 210 may be a femto cell or some other type of back-end network device. End unit 210 may send traffic to and/or receive traffic from hub unit 220 via an air interface. One or more of hub units 210 may be associated with a radio access network (RAN), a local wireless network, or the like. End unit 210 may include control logic to determine that end unit 210 and hub unit 220 should communicate via aggregated multiple links. End unit 210 may provide channel information to direct hub unit 220 to communicate via the aggregated multiple links.

Hub unit 220 may include a network device that is capable of communicating with one or more end units 210 and/or a network (e.g., back-end network 230 and/or external network 240). For example, hub unit 220 may include a small cell, a femto cell, a macro cell, and/or or some other type of network device that transmits and/or receives traffic. Hub unit 220 may be associated with a RAN, a local wireless network, or the like. Hub unit 220 may provide connectivity to external network 240. For example, hub unit 220 may connect to an eNB associated with external network 240 (e.g., via a fiber connection or a wireless cellular connection). In some implementations, end unit 210 and hub unit 220 may be deployed to provide connectivity to external network 240 when a line-of-site to a network device associated with external network 240 (e.g., an eNB) is unavailable. In some implementations, multiple hub units 220 may communicate within back-end network 230 via aggregated bands to transmit and/or receive a data flow to and/or from end unit 210.

Back-end network 230 may include one or more wireless networks via which end unit 210 and hub unit 220 communicate. For example, back-end network 230 may include NLOS network. Additionally, or alternatively, network 230 may include a local area network (LAN), a wide area network (WAN), a metropolitan network (MAN), an ad hoc network, a managed Internet Protocol (IP) network, a virtual private network (VPN), an intranet, a fiber optic-based network, and/or a combination of these or other types of networks.

External network 240 may include one or more wired and/or wireless networks. In general, network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. In some implementations, external network 240 may include a LAN, a WAN, a MAN, the Public Switched Telephone Network (PSTN), an ad hoc network, a managed IP network, VPN, an intranet, the Internet, a fiber optic-based network, and/or a combination of these or other types of networks.

The quantity of devices and/or networks in environment is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
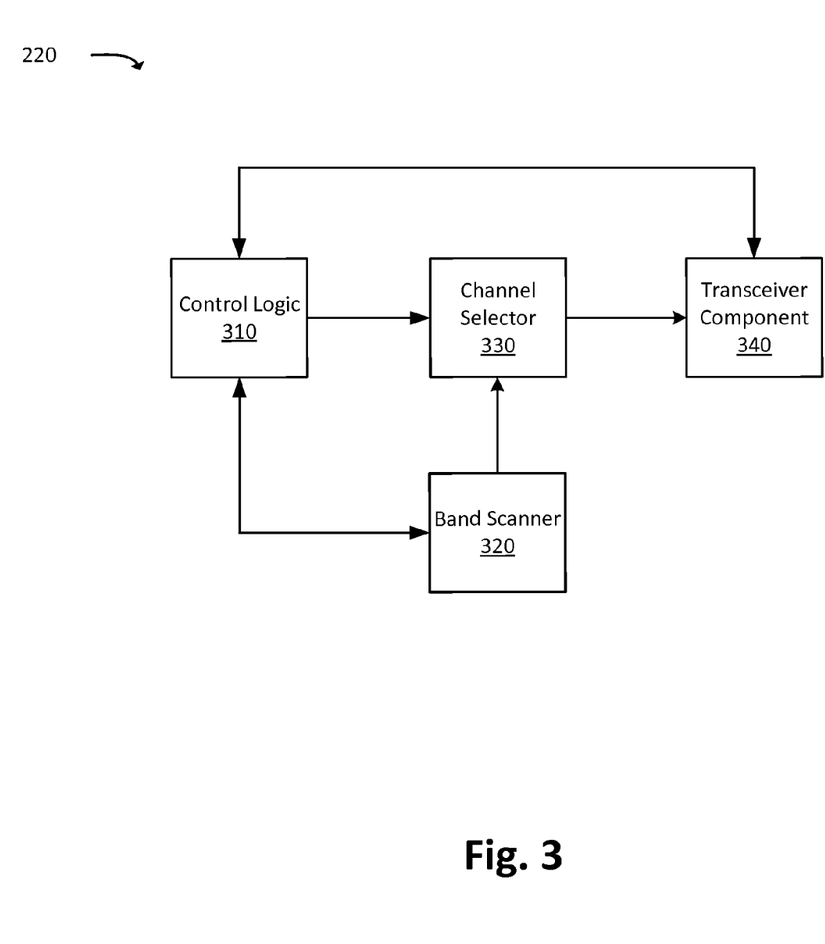
FIG. 3 illustrates example components of a hub unit.

FIG. 3 illustrates example components of a hub unit. As shown in FIG. 3, hub unit 220 may include control logic 310, band scanner 320, channel selector 330, and transceiver component 340.

Control logic 310 may determine that end unit 210 and hub unit 220 should communicate via aggregated multiple links. For example, control logic 310 may determine that end unit 210 and hub unit 220 should communicate via the aggregated multiple links based on a measure of performance of the communication between end unit 210 and hub unit 220 (e.g., a measure of data rates, latency, jitter, packet-loss etc.). In some implementations, the measure of performance of the communication may be determined based on data flows transmitted between end unit 210 and hub unit 220 via transceiver component 340. Additionally, or alternatively, control logic 310 may determine that end unit 210 and hub unit 220 should communicate via aggregated multiple links based on availability of unlicensed bands in an unlicensed spectrum. Additionally, or alternatively, control logic 310 may determine that end unit 210 and hub unit 220 should communicate via aggregated multiple links based on some other factor or measurement.

Control logic 310 may also determine a quantity of secondary links via which end unit 210 and hub unit 220 may communicate (e.g., based on the performance measurements of communication between end unit 210 and hub unit 220 via the primary band). For example, the lower the performance measurements of the communication via the primary band, the more secondary links may be established.

Control logic 310 may output information to direct channel selector 330 to select a channel via which end unit 210 and hub unit 220 may communicate over a secondary link. For example, control logic 310 may direct channel selector 330 to select a channel via which end unit 210 and hub unit 220 may communicate over a static secondary link.

Band scanner 320 may include a spectrum analyzer and/or some other type of device that may measure signal quality in frequency bands. For example, band scanner 320 may measure interference and/or noise present for data transmitted in particular frequency bands. Band scanner 320 may further measure total radiated power associated with the particular frequency bands. The total radiated power may include transmission power and/or antenna gain measurements. Band scanner 320 may also determine a measure of reliability between end unit 210 and end unit 220. Additionally, or alternatively, band scanner 320 may determine a measure of reliability and/or performance between a link or communication between hub unit 220 and a network device that connects hub unit 220 to external network 240 (e.g., an eNB device or the like). Band scanner 320 may provide the band quality information (e.g., the interference, noise, radiated power, and/or reliability measurements) to channel selector 330. Band scanner 320 may also provide information regarding band availability. As described in greater detail below, channel selector 330 may exclude particular bands from being assigned based on the band quality information and/or based on the band availability information.

Channel selector 330 may store information identifying bands (e.g., unlicensed bands) and corresponding channels. Channel selector 330 may receive an instruction from control logic 310 to select a channel via which end unit 210 and hub unit 220 may communicate over a static secondary link.

In some implementations, the selected band information may exclude channels associated with currently assigned bands. In some implementations, the selected band information may include information identifying the frequency range of the unlicensed band corresponding to the channel identifiers in the sequence. The sequence of channel identifiers, included in the selected band information, may correspond to unlicensed bands that are to be dynamically assigned for data flow transmission. Channel selector 330 may provide the selected band information to transceiver component 340.

Channel selector 330 may receive band quality information and band availability information from band scanner 320. Channel selector 330 may select a particular channel based on the information received from band scanner 320, and provide selected band information identifying the selected channel. In some implementations, channel selector 330 may select multiple channels when multiple secondary links are to be established between end unit 210 and hub unit 220 (e.g., based on information provided by control logic 310). In some implementations, channel selector 330 may determine which channels to select, and a quantity of channels to select when particular criteria are met. For example, channel selector 330 may determine a quantity of channels to select and which particular channels to select when interference, noise, radiated power, and/or reliability measurements satisfy particular thresholds. As an example, channel selector 330 may determine a quantity of channels to select based on a target reliability value, and current reliability measurements of a communication between hub unit 220 and a network device associated with external network 240. An example of reliability measurements using multiple links is shown below.

TABLE 1

| 1 Link | 2 Links | 3 Links |
|--------|---------|---------|
| 90.00% | 99.00%  | 99.90%  |
| 91.00% | 99.19%  | 99.93%  |
| 92.00% | 99.36%  | 99.95%  |
| 93.00% | 99.51%  | 99.97%  |
| 94.00% | 99.64%  | 99.98%  |
| 95.00% | 99.75%  | 99.99%  |

As illustrated in Table 1, using additional channels may generally increase the increase the overall reliability of the aggregated link. As an example, for a target reliability of 99.5%, channel selector 330 may select two channels when the reliability of one link is 93%. Channel selector may select three channels when the reliability of one link is 90%, 91%, or 92%.

Channel selector 330 may dynamically select the quantity of channels and the particular channels as conditions change (e.g., as interference, noise, radiated power, and/or reliability). In some implementations, channel selector 330 may determine a coding scheme based on the band quality and/or availability information, and provide information regarding the coding scheme so that a data flow may be orthogonally coded to multiple bands. In some implementations, channel selector 330 may receive information (e.g., from an operator of hub unit 220) identifying a targeted channel that may be prioritized for selection (e.g., if the target selection is available and if performance measurements of the target channel satisfy particular thresholds).

Transceiver component 340 may receive the selected band information, and may provide the selected band information to hub unit 220 over a primary link. In some implementations, the selected band information may include control information that is transmitted separately or otherwise distinguished from other data (e.g., substantive user data) that is unrelated to the selected band information.

Hub unit 220 may transmit and/or receive a data flow (e.g., to and/or from transceiver component 340) via secondary links (e.g., associated with either licensed or unlicensed bands), identified in the selected band information. In some implementations, transceiver component 340 may transmit and/or receive the data flow (e.g., to and/or from hub unit 220) via the band(s), identified in the selected band information. For example, hub unit 220 may orthogonally code the data flow to the bands identified in the selected band information. As a result, hub unit 220 and end unit 210 may communicate via an aggregation of multiple links associated with multiple bands. While control logic 310, band scanner 320, channel selector 330, and transceiver component 340 are described as being part of hub unit 220, in practice, control logic 310, and band scanner 320, and/or channel selector 330 may be implemented external to hub unit 220.

Figure 4:
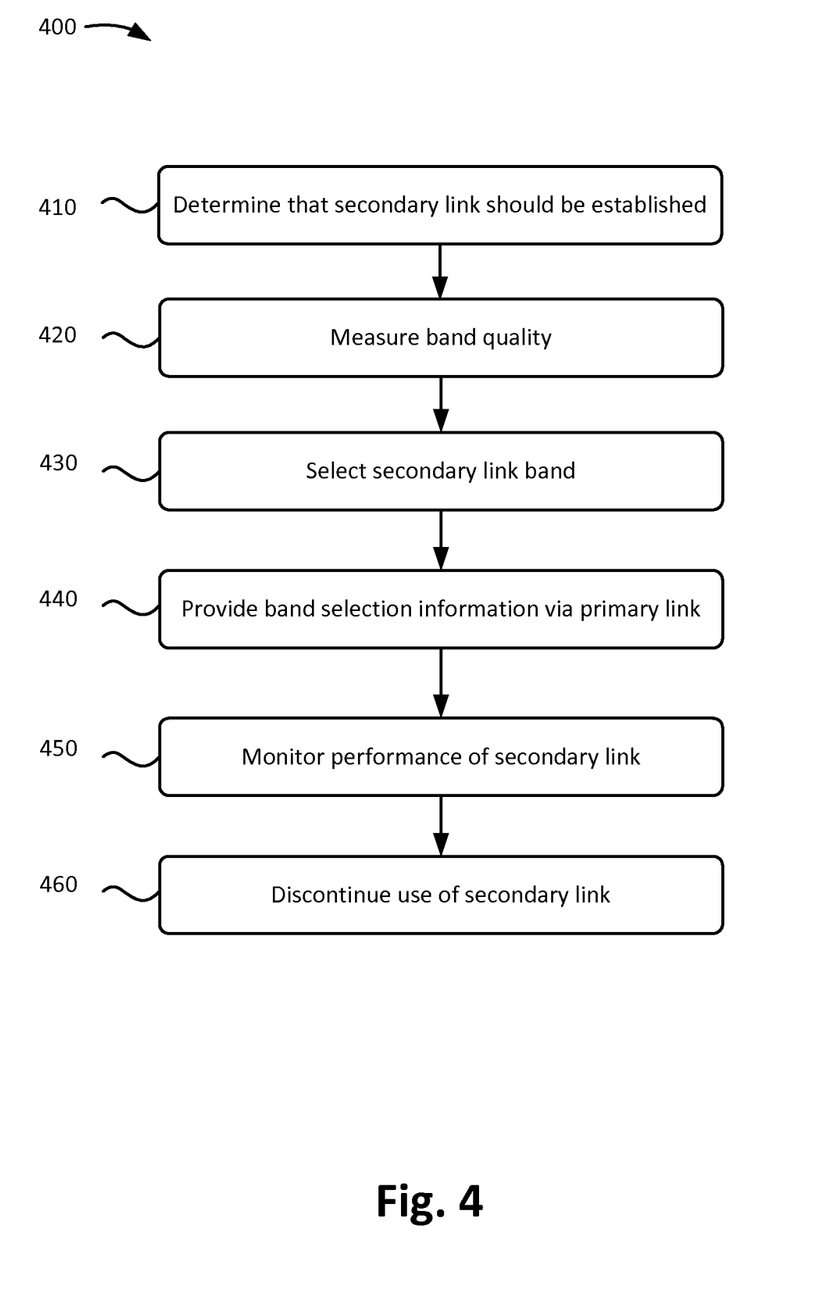
FIG. 4 illustrates a flowchart of an example process for transmitting and receiving a data flow via aggregated multiple links.

FIG. 4 illustrates a flowchart of an example process 400 for transmitting and receiving a data flow via aggregated links. In some implementations, process 400 may be performed by one or more components of hub unit 220. In some implementations, some or all of blocks of process 400 may be performed by one or more components of another device in environment 200 (e.g., end unit 210), or a group of devices including or excluding hub unit 220.

As shown in FIG. 4, process 400 may include determining that a secondary link should be established (block 410). For example, hub unit 220 may determine that the secondary link should be established (e.g., for data flow transmission via aggregated links) when bandwidth measurements (e.g., data rates, latency, jitter, etc.) between end unit 210 and hub unit 220 are below a particular threshold. Hub unit 220 may determine that the secondary link should be established in order to supplement bandwidth provided by the licensed band and to increase the bandwidth of the communication between hub unit 220 and end unit 210. Additionally, or alternatively, hub unit 220 may determine that the secondary link should be established based on identifying that end unit 210 is capable of transmitting and/or receiving data flows via aggregated links. Hub unit 220 may also determine a quantity of secondary links via which end unit 210 and hub unit 220 may communicate (e.g., based on the performance measurements of communication between end unit 210 and hub unit 220 via the primary band). For example, the lower the performance measurements of the communication via the primary band, the more secondary links may be established.

Process 400 may also include measuring band quality (block 420). For example, hub unit 220 may measure the band quality using band scanner 320 as described above. Hub unit 220 may measure band interference for each unlicensed band in a spectrum. As an example, for an unlicensed band having the frequency range of 10 gigahertz (GHz) to 11 GHz, hub unit 220 may measure the interference or noise included in the unlicensed band having the frequency range of 10 GHz to 11 GHz. Hub unit 220 may identify unlicensed bands whose measure of interference/noise exceeds a particular threshold, and may exclude these unlicensed bands from being selected for communication with end unit 210. As described above, hub unit 220 may also determine (e.g., using band scanner 320) total radiated power associated with the frequency bands. The total radiated power may include transmission power and/or antenna gain measurements. Hub unit 220 may also measure (e.g., as part of measuring band quality), link reliability of communications between hub unit 220 and a network device associated with external network 240. Hub unit 220 may store information regarding the availability of the bands.

Process 400 may further include selecting a secondary link band (block 430). For example, hub unit 220 may select a particular band in the spectrum that meets particular criteria. As an example, hub unit 220 may select the particular band that is available, whose measure of interference is below a particular threshold, and whose total radiated power measurements exceed a particular threshold. Additionally, or alternatively, hub unit 220 may select the particular band based on some other criterion. If multiple bands meet the criteria, hub unit 220 may randomly select a particular one of the multiple bands, or may select the band whose interference is the lowest and/or whose total radiated power is the highest. As described above, hub unit 220 may determine a quantity of bands to select based on the band quality information. Further, hub unit 220 may dynamically change a selected band and/or change a quantity of selected bands as conditions change. In some implementations, hub unit 220 may select multiple bands for when multiple secondary links are to be established between end unit 210 and hub unit 220. Hub unit 220 may also select a particular coding sequence based on the band quality information.

Process 400 may also include providing band selection information via a primary link (block 440). For example, hub unit 220 may provide the band selection information (e.g., information identifying a channel of the selected band) to end unit 210 via the primary link over which hub unit 220 and end unit 210 communicate. In some implementations, the band selection information may include the particular coding sequence. Based on the selected band information, end unit 210 may establish a secondary link using the secondary band to transmit and/or receive an orthogonally coded data flow (e.g., a data flow divided into orthogonally coded data signals) via multiple bands. In some implementations, the primary link may be a communication link associated with a licensed communication band and the secondary links may be communications links associated with unlicensed communication bands. Alternatively, the primary link may be a communication link associated with an unlicensed communication band and the secondary links may be communications links associated with unlicensed communication bands. Alternatively, the primary link may be a communication link associated with an licensed communication band and the secondary links may be communications links associated with licensed communication bands.

Process 400 may also include monitoring the performance of the secondary link (block 450). For example, hub unit 220 may monitor bandwidth measurements and/or error rates of the data signals transmitted via the secondary link. In some implementations, hub unit 220 may provide test packets via the secondary link, and identify the bit rate, latency, jitter, and/or some other bandwidth measurement associated with the transmission of the test packets. Additionally, or alternatively, hub unit 220 may monitor the performance of the secondary link using some other technique.

At some point, process 400 may further include discontinuing use of the secondary link (block 460). For example, hub unit 220 may discontinue use of the secondary link (e.g., discontinuing the transmission of the data signals via the secondary link) when a measure of the performance drops below a particular threshold. In some implementations, the performance may drop below the particular threshold based on the presence of interference in the channels associated with the secondary link. Additionally, or alternatively, the performance may drop below the particular threshold based on some other condition.

Figure 5A:
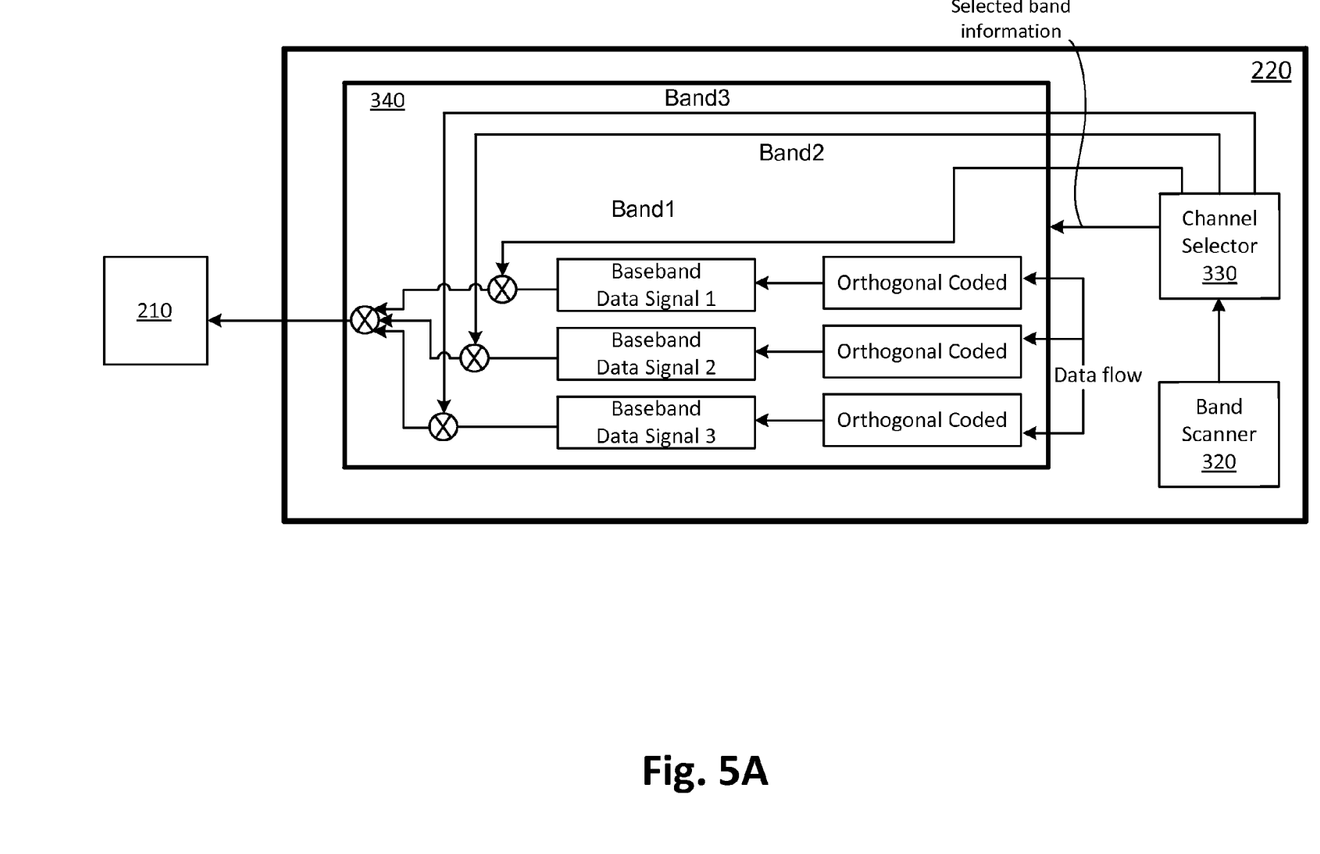
FIGS. 5A and 5B illustrate example implementations for transmitting and receiving a data flow via aggregated multiple links.
Figure 5B:
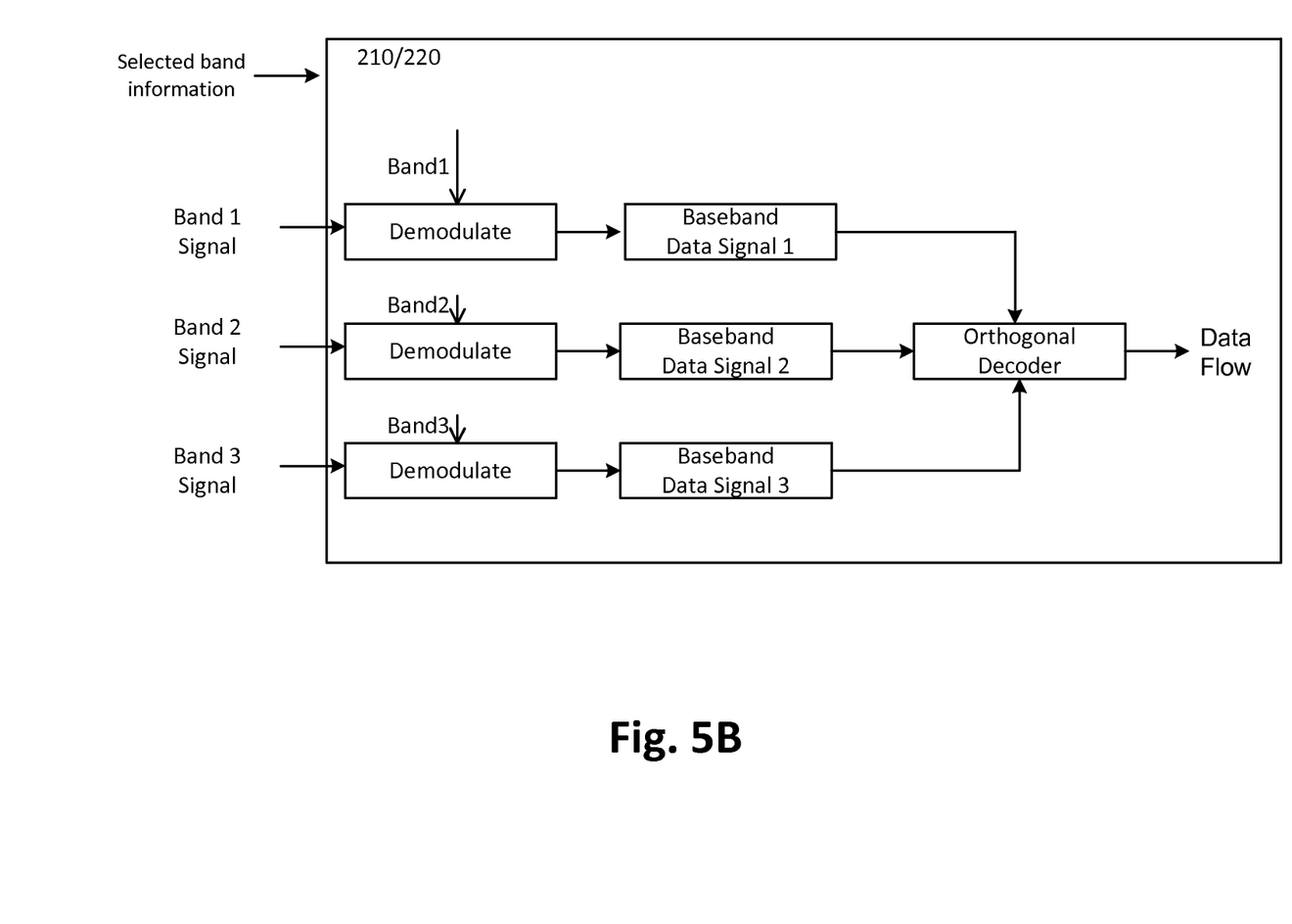

FIGS. 5A and 5B illustrate example implementations for transmitting and receiving a data flow via aggregated multiple links. As shown in FIG. 5A, channel selector 330 of hub unit 220 may provide selected band information. For example, channel selector 330 may provide the selected band information based on information received from band scanner 320 and/or when particular criteria are met (e.g., when network performance measurements satisfy a particular threshold, when total radiated power satisfies a particular threshold, etc.). The selected band information may be provided to end unit 210 (e.g., over a primary link). As described above, the bands and the number of bands may be dynamically selected as network conditions change (e.g., as total radiated power measurements change, as link quality and reliability measurements change, etc.). The selected band information may include parameters relating to a coding scheme used to encode a data flow into multiple data signals that represent the data flow. The number of data signals in which the data flow is divided may be based on the number of bands via which the data flow is to be transmitted (e.g., as determined by channel selector 330 as described above).

As shown in FIG. 5A, transceiver component 340 of hub unit 220 may orthogonally code the data flow to the divide the data flow into multiple data signals. In the particular example of FIG. 5A, hub unit 220 may divide the data flow into three data signals. The data flow may be divided into the multiple data signals at the physical layer.

Once the data flow has been divided into the multiple data signals (e.g., baseband signals), the baseband signals may then be modulated based on the corresponding selected bands and then transmitted to a receiver (e.g., end unit 210). Further, the selected band information may also be transmitted to permit the receiver to identify the selected bands and the coding scheme (e.g., to decode baseband signals received via multiple bands).

While FIG. 5A shows hub unit 220 as a transmitter that transmits the data flow and end unit 210 as a receiver that receives the data flow, in practice, end unit 210 may be a transmitter that transmit the data flow as described, and hub unit 220 may be a receiver that receives the data flow via the multiple bands.

Referring to FIG. 5B, a receiver (e.g., end unit 210 or hub unit 220), may receive data signals, representative of a data flow, via multiple bands. In the particular example of FIG. 5B, the receiver may receive three data signals via three bands. The receiver may also receive selected band information. The receiver may demodulate the three data signals based on the selected bands. The demodulated signals (e.g., the baseband signals), may then be orthogonally decoded to recover the data flow.

Figure 6:
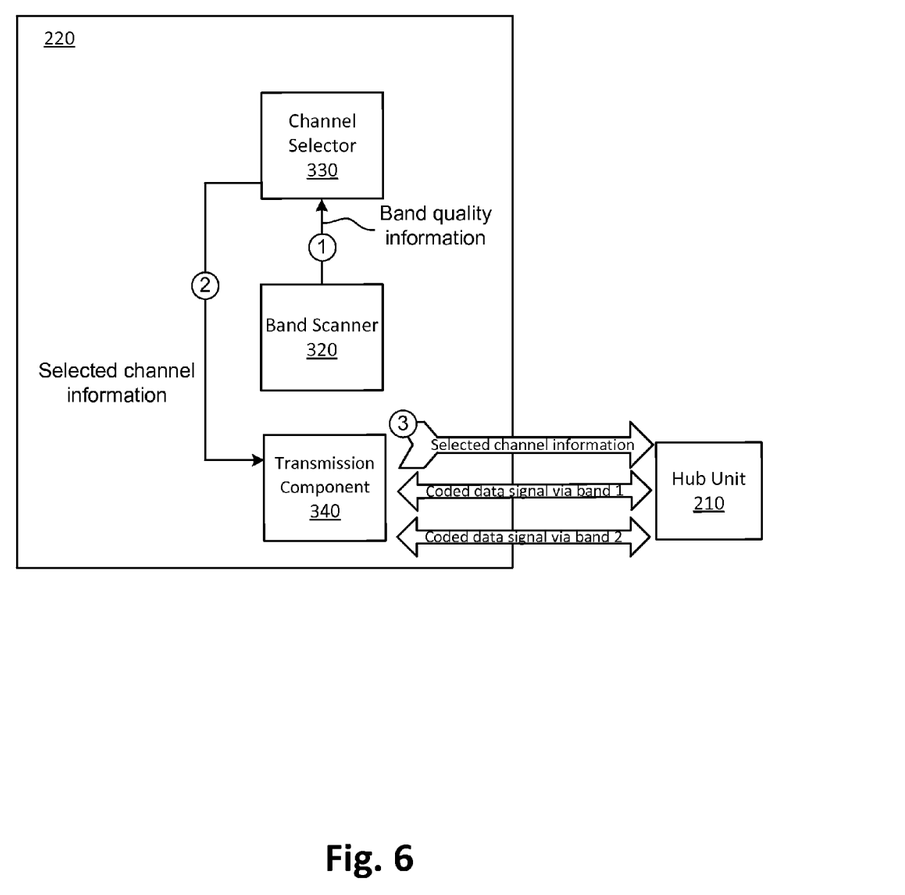
FIG. 6 illustrates an example implementation for transmitting a data flow via aggregated multiple bands.

FIG. 6 illustrates example implementations for transmitting a data flow via aggregated bands. In FIG. 6, assume that hub unit 220 identifies that a secondary link is to be established to transmit and/or receive a data flow to and/or from end unit 210 via the multiple bands. Based on determining the secondary link should be established, hub unit 220 may determine band quality information (e.g., using band scanner 320 as shown at arrow 1). Based on the band quality information, hub unit 220 may select a channel (e.g., using channel selector 330) and provide selected band information to end unit 210 via transceiver component 340 (arrows 2 and 3). Hub unit 220 and end unit 210 may then transmit and/or receive a data flow using the multiple bands (corresponding to the selected band identified in the selected band information).

While a particular example is shown in FIG. 6, it will be apparent that the above description is merely an example implementation. Other examples are possible and may differ from what was described with regard to FIG. 6.

Figure 7:
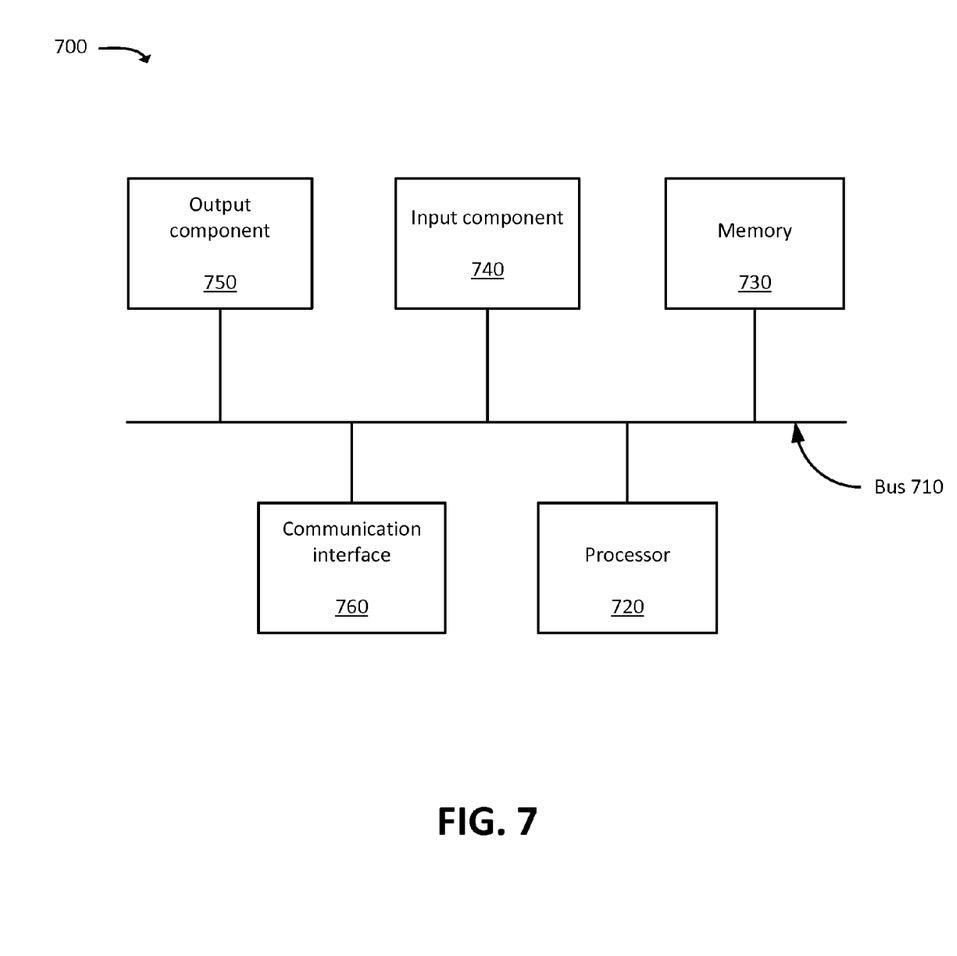
FIG. 7 illustrates example components of one or more devices, according to one or more implementations described herein.

FIG. 7 is a diagram of example components of device 700. One or more of the devices described above (e.g., with respect to FIGS. 1-3, 5A-5D, 6A, and 6B) may include one or more devices 700. Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio (Bluetooth is a registered trademark of Bluetooth SIG, Inc.), radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
    selecting, by a network device, one or more secondary bands in a spectrum based on a measure of quality of the one or more secondary bands;
    transmitting, by the network device, information identifying the one or more secondary bands to an end unit;
    coding, by the network device and based on a coding scheme, a data flow to obtain a plurality of data signals that represent the data flow;
    transmitting, by the network device and towards the end unit, the plurality of data signals via the one or more secondary bands and a primary band;
    monitoring a measure of performance of the transmission of the plurality of data signals via the one or more secondary bands; and
    discontinuing transmission of the plurality of data signals via the one or more secondary bands when the measure of performance satisfies a particular threshold.

2. The method of claim 1, wherein coding the data flow includes orthogonally coding the data flow.

3. The method of claim 1, wherein a quantity of obtained data signals is based on a quantity of secondary bands selected by the network device.

4. The method of claim 1, wherein measuring the quality of the one or more secondary bands includes:
    measuring interference or noise,
    measuring total radiating power, or
    measuring reliability in a communication between the network device and an external network not accessible to the end unit.

5. The method of claim 1, wherein the network device corresponds to a network device in a back-end network of a cellular network.

6. A method comprising:
    selecting, by a network device, one or more secondary bands in a spectrum based on a measure of quality of the one or more secondary bands;
    transmitting, by the network device, information identifying the one or more secondary bands to an end unit;
    coding, by the network device and based on a coding scheme, a data flow to obtain a plurality of data signals that represent the data flow;
    transmitting, by the network device and towards the end unit, the plurality of data signals via the one or more secondary bands and a primary band; and
    determining a quantity of secondary bands to be selected based on the measure of quality of the one or more secondary bands, wherein selecting the one or more secondary bands includes selecting the determined quantity of secondary bands.

7. The method of claim 6, further comprising:
determining an updated quantity of secondary bands based on a change in the measure of quality of the one or more secondary bands.

8. A system comprising:
a network device comprising processor circuitry to:
select one or more secondary bands in a spectrum based on a measure of quality of the one or more secondary bands;
transmit information identifying the one or more secondary bands to an end unit;
code, based on a coding scheme, a data flow to obtain a plurality of data signals that represent the data flow;
transmit, towards the end unit, the plurality of data signals via the one or more secondary bands and a primary band;
monitor a measure of performance of the transmission of the plurality of data signals via the one or more secondary bands; and
discontinue transmission of the plurality of data signals via the one or more secondary bands when the measure of performance satisfies a particular threshold.

9. The system of claim 8, wherein when coding the data flow, the network device is to orthogonally code the data flow.

10. The system of claim 8, wherein a quantity of obtained data signals is based on a quantity of secondary bands selected by the network device.

11. The system of claim 8, wherein the network device is further to:
determining a quantity of secondary bands to be selected based on the measure of quality of the one or more secondary bands,
wherein when selecting the one or more secondary bands, the network device is further to select the determined quantity of secondary bands.

12. The system of claim 8, wherein the network device is further to:
determining an updated quantity of secondary bands based on a change in the measure of quality of the one or more secondary bands.

13. The system of claim 8, wherein when measuring the quality of the one or more secondary bands, the network device is to:
measure interference or noise,
measure total radiating power, or
measure reliability in a communication between the network device and an external network not accessible to the end unit.

14. The system of claim 8, wherein the network device corresponds to a network device in a back-end network of a cellular network.

15. The system of claim 8, wherein the network device is a first network device,
wherein when transmitting, towards the end unit, the plurality of data signals via the one or more secondary bands and a primary band, the first network device is to transmit, towards the end unit, the plurality of data signals via the one or more secondary bands and a primary band, the transmitting being performed via a second network device.

16. A non-transitory computer-readable medium for storing instructions, the instructions comprising:
a plurality of instructions which, when executed by one or more processors associated with a first device, cause the one or more processors to:
receive, via a primary band from a second device in a back-end network, information identifying one or more secondary bands;
receive, from the second device and via the primary band and the one or more secondary bands, a plurality of data signals representative of a data flow originating from an external network that is separate from the back-end networks;
provide measures of performance of the transmission of the data flow via the one or more secondary bands; and
discontinue receipt of the plurality of data signals via the one or more secondary bands when the measure of performance satisfies a particular threshold.

17. The non-transitory computer-readable medium of claim 16, wherein the plurality of instructions further cause the one or more processors to:
orthogonally decode the data signals to recover the data flow.

18. The non-transitory computer-readable medium of claim 16, wherein the data flow is orthogonally coded.

19. The non-transitory computer readable medium of claim 16, wherein a quantity of the plurality of data signals is based on a quantity of the one or more secondary bands.

20. The non-transitory computer readable medium of claim 16, wherein the measurement of performance includes:
a measurement interference or noise, or
a measurement of total radiating power.

* * * * *